(12) United States Patent
Bolz

(10) Patent No.: US 6,788,015 B2
(45) Date of Patent: Sep. 7, 2004

(54) BRUSHLESS DC MACHINE

(75) Inventor: Martin-Peter Bolz, Buehl (DE)

(73) Assignee: Robetr Bosch GmbH, Stuttgart (DE)

( * ) Notice: Subject to any disclaimer, the term of this patent is extended or adjusted under 35 U.S.C. 154(b) by 0 days.

(21) Appl. No.: 10/203,766

(22) PCT Filed: Dec. 21, 2001

(86) PCT No.: PCT/DE01/04862

§ 371 (c)(1),
(2), (4) Date: Aug. 13, 2002

(87) PCT Pub. No.: WO02/058203

PCT Pub. Date: Jul. 25, 2002

(65) Prior Publication Data

US 2003/0011335 A1 Jan. 16, 2003

(30) Foreign Application Priority Data

Jan. 19, 2001 (DE) .......................................... 101 02 235

(51) Int. Cl.$^7$ ................................................ H02P 7/50
(52) U.S. Cl. ....................... 318/439; 318/254; 318/138; 318/434; 318/432
(58) Field of Search ................................ 318/254, 138, 318/139, 432, 434, 439, 421; 388/800; 338/21; 361/86, 112, 23, 24, 103–106

(56) References Cited

U.S. PATENT DOCUMENTS

| 4,242,713 A | * | 12/1980 | Lewis et al. .................. 361/86 |
| 4,535,275 A | * | 8/1985 | Muller ........................ 318/254 |
| 4,687,977 A | * | 8/1987 | Brahmavar et al. ......... 318/492 |
| 5,418,516 A | * | 5/1995 | Oh .............................. 338/21 |

FOREIGN PATENT DOCUMENTS

| DE | 31 44 742 A | 5/1983 |
| DE | 37 09 168 A1 | 9/1988 |
| DE | 199 01 351 A | 7/2000 |

* cited by examiner

Primary Examiner—Robert Nappi
Assistant Examiner—Renata McCloud
(74) Attorney, Agent, or Firm—Michael J. Striker

(57) ABSTRACT

In a brushless, electronically commutated direct-current machine, in particular a direct-current motor, having a multiphase stator winding (12) and having electronic power switches (15) that are connected in series with the winding phases (13), in order to rapidly switch off the direct-current machine when there is at least one defective power switch (15), a malfunction protection device is provided, which has a fuse (16) that is electrically heated in the event of a malfunction and that has a fuse wire (17), which carries the machine current (FIG. 1).

9 Claims, 1 Drawing Sheet

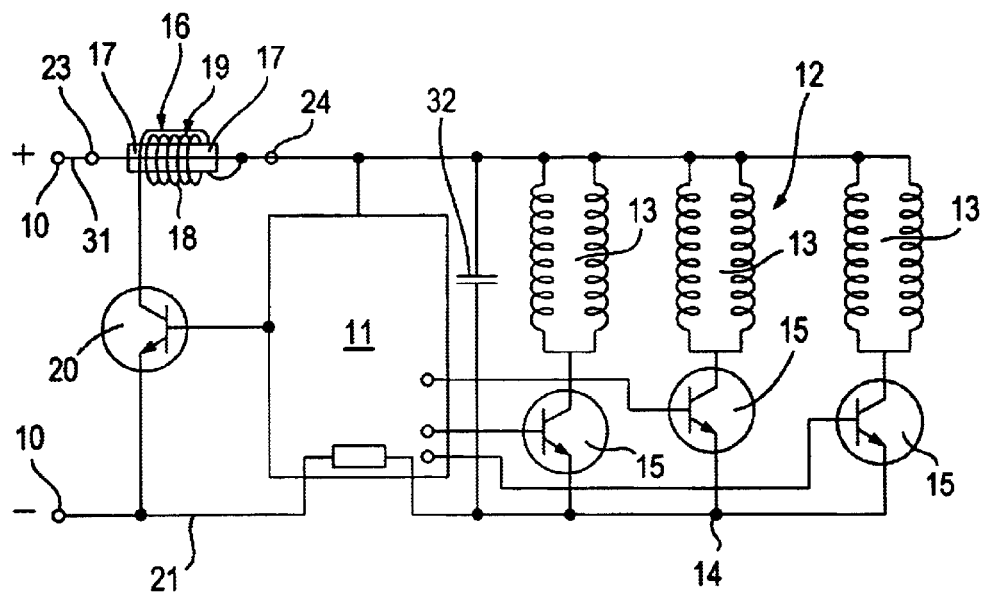
FIG. 1
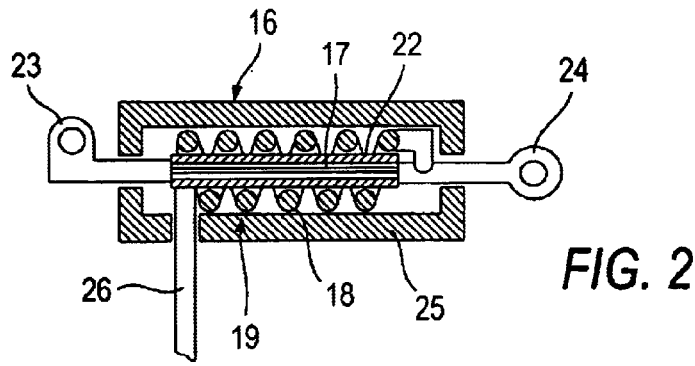
FIG. 2
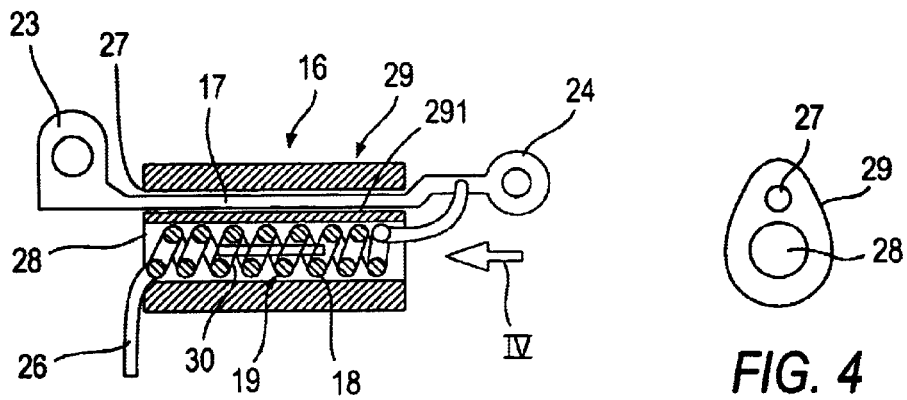
FIG. 3
FIG. 4

BRUSHLESS DC MACHINE

BACKGROUND OF THE INVENTION

The invention is based on a brushless, electrically commutated direct-current machine, in particular a direct-current motor.

In a brushless direct-current machine of this kind, which is described for example as a direct-current motor in DE 37 09 168 A1, the electronic power switches, which are embodied as transistors in each winding phase, are disposed on the high-voltage side of the winding phase, connected in series with it. The power switches are successively connected to the network direct-current by the control unit, which includes a control stage for generating switching signals and a logic stage for applying the switching signals to the power switches in the correct sequence.

When field effect transistors, in particular MOSFETs, are used as low-cost electronic power switches, they are disposed on the low-voltage side of the winding phases as so-called low-side switches.

In a direct-current machine of this kind, if a power switch fails, then two possible malfunctions can occur: the power switch is shut completely off, or the power switch is conductive and conducts constant current, with or without residual resistance. In the first instance, the function of the direct-current machine is limited or does not function at all, but this is not critical. The second instance can give rise to a dangerous situation as the stator winding of the machine and the power switches heat up and can cause a fire as a result of the constant current. The temperature-sensitive fuses sometimes provided in the supply line to the machine cannot solve this problem because they have to be designed for a current that can also be greater than this constant current. In addition, due to their series divergence, fuses conduct up to seven times their nominal current so that there is the danger that the stator winding and/or the electrical circuit will start to burn before the fuse reacts.

SUMMARY OF THE INVENTION

The brushless direct-current machine according to the Invention, has the advantage that due to the heating, the fuse wire melts much more rapidly than when it is only heated by the machine or motor current flowing through it. Another advantage is that during normal operation, due to the extremely low ohmic resistance of the fuse wire, the fuse does not represent an additional resistance in the electrical circuit that might negatively influence the efficiency of the machine or motor.

According to a preferred embodiment of the invention, the heating current for electrically heating the fuse is conveyed by means of the fuse wire itself. In addition to heating the fuse wire, this measure further increases the flow of current through the fuse wire by the amount of the heating current required for the heating so that the melting temperature is reached much more rapidly. This also produces the advantage that the heating current is switched off automatically when the fuse wire melts.

According to an advantageous embodiment of the invention, in order to electrically heat the fuse, a heating wire or a heating cartridge extends along the fuse wire and is connected in series with an electronic switch, which closes in the event of a malfunction, connected in parallel with the stator winding. The electronic switch here is advantageously controlled by the control unit for the electronic power switches in the stator winding.

According to an advantageous embodiment of the invention, the time interval from the occurrence of the malfunction to the reaction of the fuse is further reduced in that the control unit is designed so that in the event of a malfunction, it sends a control signal to all of the power switches that causes them to close. As a result, the current flowing through the fuse wire is increased to an extremely high level and the melting temperature is reached in an extremely short period of time.

According to an advantageous embodiment of the invention, a pyrotechnic percussion cap that can be ignited by being heated can alternatively or additionally be disposed on or near the fuse wire and is connected in a thermally conductive manner to the heating wire. The ignition of the percussion cap breaks the fuse wire and switches the machine off. The heating current required to make the percussion cap react can therefore be designed to be a great deal lower than the heating current required to heat the fuse wire of the fuse.

According to an advantageous embodiment of the invention, the power supply for the control unit is tapped between the fuse and the stator winding, preferably before a capacitor used for smoothing. This has the advantage that when the stator winding is disconnected from the direct-current network by the reacting fuse, the power supply to the control unit is also switched off.

BRIEF DESCRIPTION OF THE DRAWINGS

The invention will be explained in detail in the description below in conjunction with exemplary embodiments shown in the drawings.

FIG. 1 shows a block circuit diagram of an electronically commutated, brushless direct-current motor, FIG. 2 shows a schematic section through a fuse in the circuit of the direct-current motor according to FIG. 1, FIG. 3 shows a depiction equivalent to FIG. 2, according to another exemplary embodiment of the fuse, and FIG. 4 shows a view of a ceramic body of the fuse in the direction of the arrow IV in FIG. 3.

DESCRIPTION OF THE PREFERRED EMBODIMENTS

The electronically commutated, brushless direct-current motor, which is shown in the block circuit diagram in FIG. 1 as an exemplary embodiment for a generic direct-current machine, is operated by means of a control unit 11 for electronic commutation in a direct-current source 10. In a known manner, the direct-current motor, of which only the stator winding 12 is shown here, has a stator, which encompasses the stator winding 12, and a rotor that rotates in the stator and has permanent magnetic poles or, in the case of a so-called SR motor (switch reluctance motor), has a groove-and-tooth geometry. The stator winding 12, which in the exemplary embodiment is a three-phase winding, has three winding phases 13 wired in a star shape, which are connected via a supply line 31 to the positive potential of the direct-current network 10. An electronic power switch 15 is disposed between each winding phase 13 and the star point 14, which is connected via a return line 21 to the negative potential of the direct-current network 10, i.e. on the low-voltage side of the stator winding 12. The power switches 15 are preferably embodied as field effect transistors, in particular MOSFETs, and are controlled by the control unit 11 so that the winding phases 13 are successively connected in the proper sequence to the direct-current network 10. A smoothing capacitor 32 is connected in parallel with the series circuits comprised of the winding phase 13 and the power switch 15.

A malfunction protection device in the form of an electrically heatable fuse 16 is provided in the supply line 31 to the stator winding 12. The fuse 16 is designed so that in the event of a malfunction, e.g. if one of the power switches 15 disposed on the "low side" in the stator winding 12 fails or if the smoothing capacitor 32 blows, the fuse 16 is heated with a heating current that brings the fuse wire 17, which carries the current in the supply line 31, rapidly to its melting temperature. To this end, the fuse 16 is also provided with a heating wire 18, which extends along the fuse wire 17 and is preferably embodied as a heating spiral 19. The heating wire 18 or heating spiral 19 is connected in series with an electronic switch 20 at the output of the fuse 16, between the supply line 31 and return line 21, and therefore is connected to the line switch 15 in parallel with the stator winding 12 so that when the electronic switch 20 closes, the heating current flowing through the heating wire 18 or heating spiral 19 also flows through the fuse wire 17. As a result, a higher current acts on the fuse wire 17, which produces additional heat in the fuse wire 18 and thus causes it to reach its melting temperature in a shorter time. In lieu of the heating wire 18 or the heating spiral 19, a heating cartridge that is not shown here can also be used to heat the fuse wire 17.

The electronic switch 20 embodied as a transistor does in fact have to switch the high heating current, but is relatively cold at the moment when it switches and only needs to execute the switch once so that it does not have to be designed as a power transistor. The electronic switch 20 is controlled by the control unit 11 in such a way that in the event of a malfunction, it receives a control signal that causes it to close. The control unit 11, whose power supply is tapped between the fuse 16 and the stator winding 12—preferably before the smoothing capacitor 32, monitors the winding phases 13 of the stator winding 12 for constant current and recognizes a malfunction when it detects a constant current in one of the winding phases 13, whereupon it sends the corresponding control signal to the electronic switch 20. The control unit 11 can recognize a constant current of this kind, for example, by monitoring the current in the return line 21 from the stator winding 12. There is a constant current in one of the winding phases 13 when a current is flowing in the return line 21 even though all of the power switches 15 have been triggered by the control unit 11 to produce a switch opening. A flow of current through the defective smoothing capacitor 32 can also be detected by monitoring the current in the return line 21. Furthermore, the control unit 11 is designed so that when it recognizes a malfunction, it sends a closing signal to all of the power switches 15 so that the current flowing through the fuse wire 17 is maximal and its increase contributes to an additional heating of the fuse wire 17.

Structural exemplary embodiments of the heatable fuse 16 are schematically depicted in FIGS. 2 and 3. In the exemplary embodiment of FIG. 2, the fuse wire 17 is embedded in a ceramic tube 22 and the heating wire 18 is wound as a heating spiral 19 onto the ceramic tube 22. The heating spiral 19 is encompassed by a protective or insulating housing 25. The fuse wire 17 is clamped between two connecting terminals 23, 24, which protrude from the protective housing 25. The positive potential of the direct-current network 10 is connected to the connecting terminal 23, while the connecting terminal 24 is connected to the stator winding 12. At one end, the heating spiral 19 is connected to the connecting terminal 24 in an electrically conductive manner inside the protective housing 25 and at the other end, has a connecting tab 26 that protrudes out from the protective housing 25 and is connected to the electronic switch 20.

In the exemplary embodiment in FIG. 3, the fuse wire 17 and the heating spiral 19 are each disposed in a bore 27 and 28 inside a ceramic body 29. The two parallel bores 27, 28 are disposed in close proximity in the ceramic body 29 so that only a thin dividing wall 291 of ceramic material remains between them. FIG. 4 shows the end view of the ceramic body 29, which has an egg-shaped cross section. The adjacent bores 27, 28 have different diameters. As in the fuse 16 according to FIG. 2, here, too, the fuse wire 17 connects the two connecting terminals 23, 24 protruding from the ceramic body 29 and the heating spiral 19 is connected at one end to the connecting terminal 24 and is connected at the other end, by means of the connecting tab 26 protruding from the ceramic body 29, to the electronic switch 20 in FIG. 1.

As depicted with dashed lines in FIG. 3, a pyrotechnic percussion cap 30 can also be disposed inside the heating spiral 19 and is ignited by being heated. The pyrotechnic percussion cap 30 is designed so that when it explodes, it reliably destroys the dividing wall 291 between the bores 27, 28 as well as the fuse wire 17 extending in the bore 27.

What is claimed is:

1. A brushless, electronically commutated direct-current machine, in particular a direct-current motor, having a multiphase stator winding (12), having electronic power switches (15) that are connected in series with the winding phases (13) of the stator winding (12), and having a control unit (11) that controls the power switches (15), wherein a malfunction protection device that has a fuse (16) is provided, which is heated by an electrical heating current in the event of a malfunction and has a fuse wire (17) that carries the machine current, and the fuse wire (17) is embedded in a ceramic tube (22) and a heating wire (18) is wound in the form of a heating spiral (19) onto the ceramic tube (22), wherein the heating wire (18) is connected in series with an electronic switch (20) that closes in the event of a malfunction and this series circuit is connected in parallel with the stator winding (12).

2. The machine according to claim 1, wherein the fuse wire (17) of the fuse (16) is disposed in a supply line (31) to the stator winding (12), which supply line is connectable to the positive potential of a direct-current network (10).

3. The machine according to claim 1, wherein the heating current for the electrical heating is conducted through the fuse wire (17) of the fuse (16).

4. The machine according to claim 1, wherein to produce the electrical heating, a heating wire (18) extends along the fuse wire (17) and is connected to it in a thermally conductive manner.

5. The machine according to claim 1, wherein the ceramic tube (22) with the heating spiral (19) wound onto it is encompassed by a protective housing (25).

6. The machine according to claim 1, wherein electronic switch (20) is controlled by the control unit (11).

7. The machine according to claim 6, wherein in order to detect to a malfunction, the control unit (11) monitors each winding phase (13) of the stator winding (12) for constant current and when a constant current occurs in one of the winding phases (13), it generates a control signal that triggers the closing of the electronic switch (20).

8. The machine according to claim 6, wherein in the event of a malfunction, the control unit (11) sends a signal to all of the power switches (15), which causes them to close.

9. The machine according to claim 1, wherein the power supply for the control unit (11) is tapped between the fuse (16) and the stator winding (12).

* * * * *